(12) United States Patent
Duncan

(10) Patent No.: US 6,928,897 B2
(45) Date of Patent: Aug. 16, 2005

(54) BICYCLE HANDLEBAR EXTENSION WITH INTERGRAL ARMREST

(76) Inventor: Robert C. Duncan, 408 McClure Rd., Lebanon, OH (US) 45036

( * ) Notice: Subject to any disclaimer, the term of this patent is extended or adjusted under 35 U.S.C. 154(b) by 85 days.

(21) Appl. No.: 10/166,351

(22) Filed: Sep. 28, 2001

(65) Prior Publication Data
US 2003/0150292 A1 Aug. 14, 2003

(51) Int. Cl.[7] .............................................. B62K 21/12
(52) U.S. Cl. ..................................... 74/551.8; 74/551.1
(53) Field of Search ........................... 74/551.1, 551.8; D12/178, 111; 280/281.1; 403/205, 382

(56) References Cited

U.S. PATENT DOCUMENTS

| | | | |
|---|---|---|---|
| 4,750,754 A | | 6/1988 | Lennon |
| 4,878,397 A | | 11/1989 | Lennon |
| 4,951,525 A | | 8/1990 | Borromeo |
| D315,328 S | | 3/1991 | Giard, Jr. |
| 5,145,210 A | | 9/1992 | Lennon |
| 5,154,094 A | | 10/1992 | Klieber |
| 5,154,095 A | | 10/1992 | Giard, Jr. |
| 5,163,339 A | | 11/1992 | Giard, Jr. et al. |
| D332,768 S | | 1/1993 | Giard, Jr. |
| D334,164 S | | 3/1993 | Klieber |
| 5,197,350 A | * | 3/1993 | Borromeo .................. 74/551.8 |
| 5,201,243 A | * | 4/1993 | Schneider .................. 74/551.1 |
| 5,209,508 A | | 5/1993 | Lennon |
| 5,235,872 A | | 8/1993 | Giard, Jr. |
| 5,275,067 A | * | 1/1994 | Lew .......................... 74/551.1 |
| 5,353,663 A | * | 10/1994 | Samuelson ................. 74/551.8 |
| D371,530 S | | 7/1996 | Trepanier |
| 5,782,139 A | | 7/1998 | Fraiman |
| 6,092,438 A | | 7/2000 | Soto |
| D449,808 S | | 10/2001 | Soto |

FOREIGN PATENT DOCUMENTS

| | | | | |
|---|---|---|---|---|
| DE | 196 29 513 A1 | | 1/1998 | |
| EP | 0 135 420 | * | 3/1985 | ................. 74/551.8 |
| FR | 2668745 | * | 5/1992 | ................. 74/551.8 |
| JP | 7-329865 | * | 12/1995 | ................. 74/551.8 |
| JP | 10-86879 | * | 4/1998 | ................. 74/551.8 |
| WO | WO 93/00250 | * | 1/1993 | ................. 74/551.8 |

OTHER PUBLICATIONS

"The more things change . . . ," Empfield, Dan, reprinted from www.slowtwitch.com, Jun. 11, 2001.

* cited by examiner

Primary Examiner—Vinh T. Luong
(74) Attorney, Agent, or Firm—Dinsmore & Shohl LLP

(57) ABSTRACT

A handlebar extension for a bicycle handlebar includes an armrest portion and an elongate forward portion which is integral with, and extends away from the armrest portion. The handlebar extension is configured such that the armrest portion may be attached to the handlebar of a bicycle with the elongate forward portion extending forwardly away from the handlebar, supported by the armrest portion. A bicycle having a handlebar and a pair of handlebar extensions mounted to the handlebar is also provided.

5 Claims, 4 Drawing Sheets

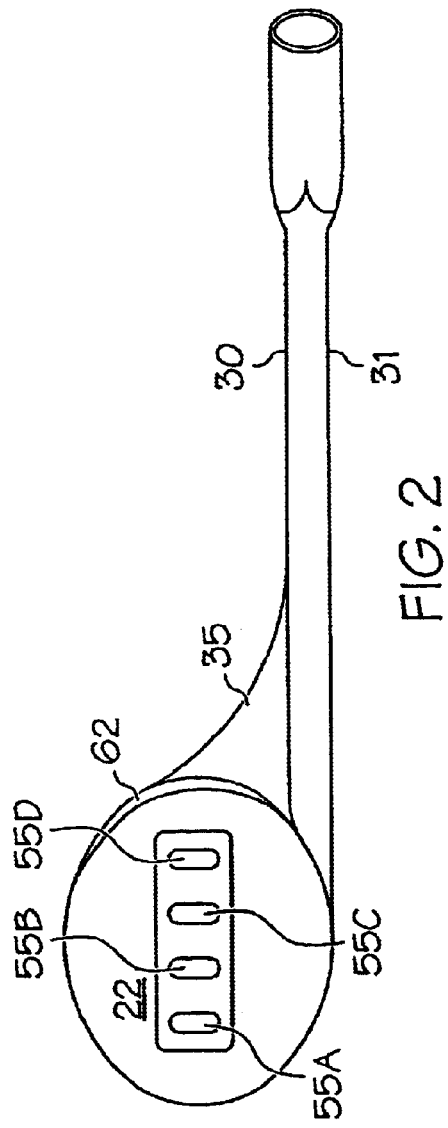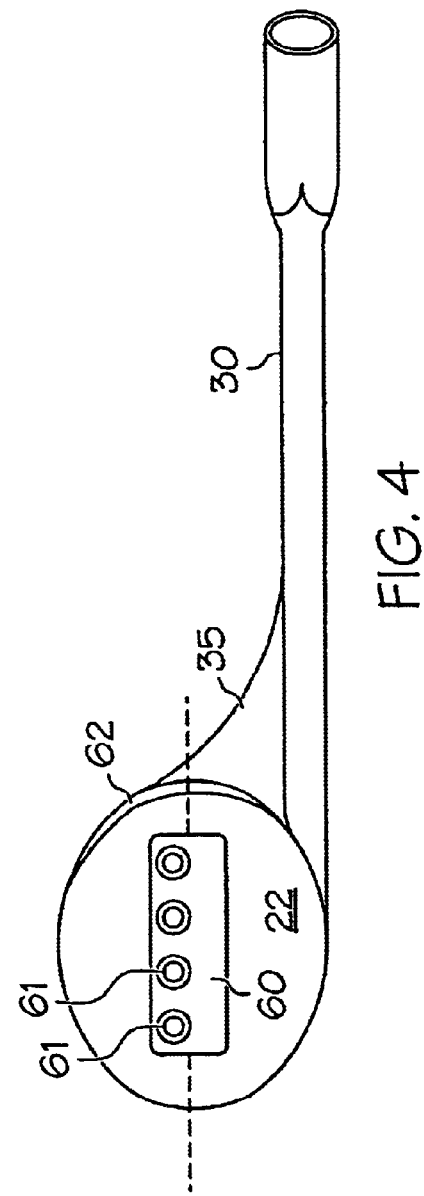

BICYCLE HANDLEBAR EXTENSION WITH INTERGRAL ARMREST

BACKGROUND OF THE INVENTION

1. Field of the Invention

The present invention relates generally to bicycles and bicycle handlebars, particularly handlebar extensions which may be attached to a bicycle handlebar for improved aerodynamics and rider comfort.

2. Description of Related Art

Bicycles generally include a handlebar for steering and controlling the bicycle. A bicycle handlebar typically comprises a tubular member in any of a variety of shapes, wherein the tubular member is secured to the bicycle frame by means of a stem. The stem is rotatingly connected to the front fork of the bicycle by means of a headset. In this manner, the handlebar can be used to turn the front fork, and therefore the front wheel, in order to steer and control the bicycle.

Bicycle handlebars come in a variety of configurations, including a simple, straight tubular member (often found on mountain bikes), "drop-style" handlebars (often found on bicycles designed for racing), and even "cowhorn-style" handlebars (often used in time trial racing, duathlons and triathlons). Regardless of the style, the handlebars are typically configured to provide one or more comfortable and safe locations for the rider to grasp the handlebar. In the case of drop-style handlebars, a plurality of suitable gripping locations are provided.

Even in the case of drop-style or cowhorn handlebars, it may often be difficult for a rider to achieve an aerodynamic and comfortable position on the bike. Conventional wisdom is that the cyclist's back should be nearly parallel to the ground in order to improve aerodynamics (or as close to parallel as can be comfortably achieved without restricting movement or breathing). However, such a position may be difficult for many riders to achieve, and is often uncomfortable over a lengthy period of time. In order to overcome these problems, many bicyclists use handlebar extensions (often referred to as "aerobars", such as that shown in U.S. Pat. No. 5,235,872) in order to achieve a comfortable position which is more aerodynamic than what may be achieved using conventional handlebars.

Handlebar extensions are typically designed to attach to a bicycle handlebar on opposite sides of the stem. In some cases, a single, U-shaped extension is employed, while in others separate extensions are provided for each arm. Armrests are usually employed with these handlebar extensions, and the armrests are typically located immediately above the handlebar on opposite sides of the stem (see FIGS. 1 and 2 of U.S. Pat. No. 5,235,872, which is incorporated herein by way of reference). The forward end of the handlebar extension also typically includes an upwardly-extending grip portion. In this manner, a cyclist using such handlebar extensions will position a portion of their forearms on the armrests, and grasp the grip portion of the extensions with their hands. In this manner, much of the rider's weight will be supported by their forearms, and their upper torso will be lowered towards a flatter, more aerodynamic position (such as shown in U.S. Pat. No. 4,750,754). In addition, additional aerodynamic benefits may result from the fact that the riders hands are extended forwardly from the stem.

One of the drawbacks of most handlebar extensions is their weight. Not only do the handlebar extensions themselves add considerable weight to the bike, but also the armrests and accompanying hardware. Furthermore, the handlebar extensions can add additional aerodynamic drag since a large portion of the extensions remain exposed below the riders forearms. Also, many riders have less control of the bicycle when using such handlebar extensions, since the grip portion of the extensions used to steer the bicycle are located a considerable distance forward of the stem.

BRIEF DESCRIPTION OF THE DRAWINGS

FIG. 2 is a top plan view of the left-handed version of the handlebar extension shown in FIG. 1;

FIG. 4 is the same view as FIG. 2, with a bolt plate in place;

DETAILED DESCRIPTION OF THE PREFERRED EMBODIMENTS

One embodiment of the present invention comprises a handlebar extension which may be attached to a bicycle handlebar. This handlebar extension, sometimes referred to in the art as an "aerobar," is configured such that, when attached to the handlebar of a bicycle, allows the rider to achieve a more comfortable and more aerodynamic position. In particular, the handlebar extension includes an armrest portion and an elongate forward portion which is integral with, and extends away from the armrest portion. When attached to the bicycle handlebar, the armrest portion will be located above the handlebar of the bicycle (e.g., directly above, or spaced forwardly or rearwardly from the handlebar), and the elongate forward portion will extend forwardly away from the handlebar. The rider may then place his or her forearm on the armrest portion with the remainder of their forearm extending forwardly on the elongate forward portion of the handlebar extension. In fact, the elongate forward portion of the handlebar extension will be positioned adjacent the interior of the rider's forearm. In this manner, the rider may even use the inner surface of their forearm to push against the elongate forward portion of the handlebar extension in order to steer and control the bicycle.

Figure 1:
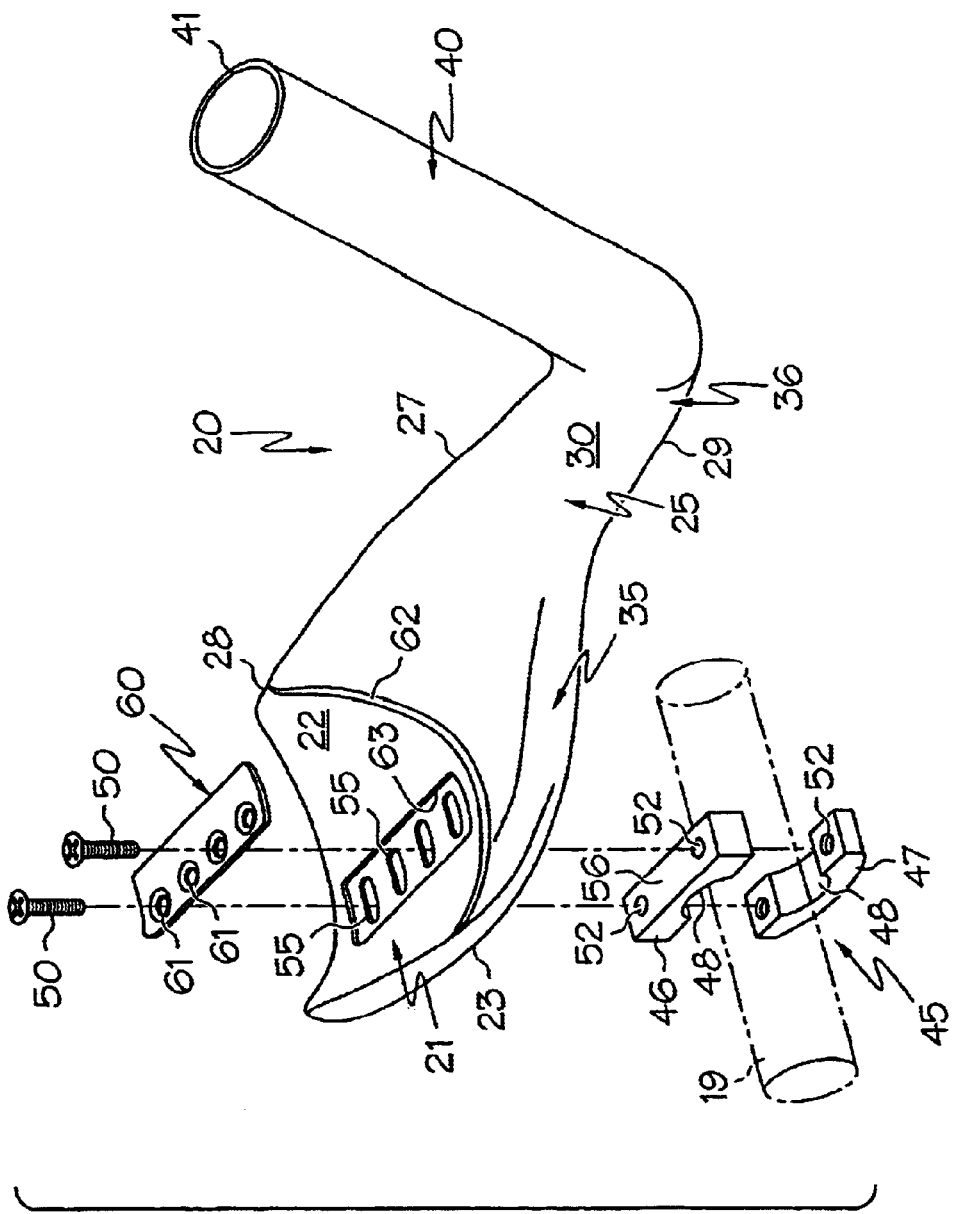
FIG. 1 is an exploded, front perspective view of one embodiment of a right-handed handlebar extension according to the present invention.
Figure 5:
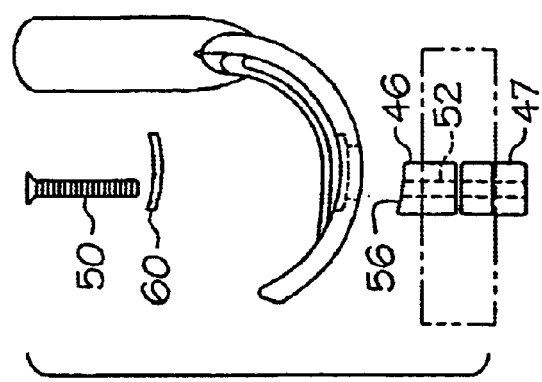
FIG. 5 is a rear end view of the left-handed version of the handlebar extension shown in FIG. 1.
Figure 6:
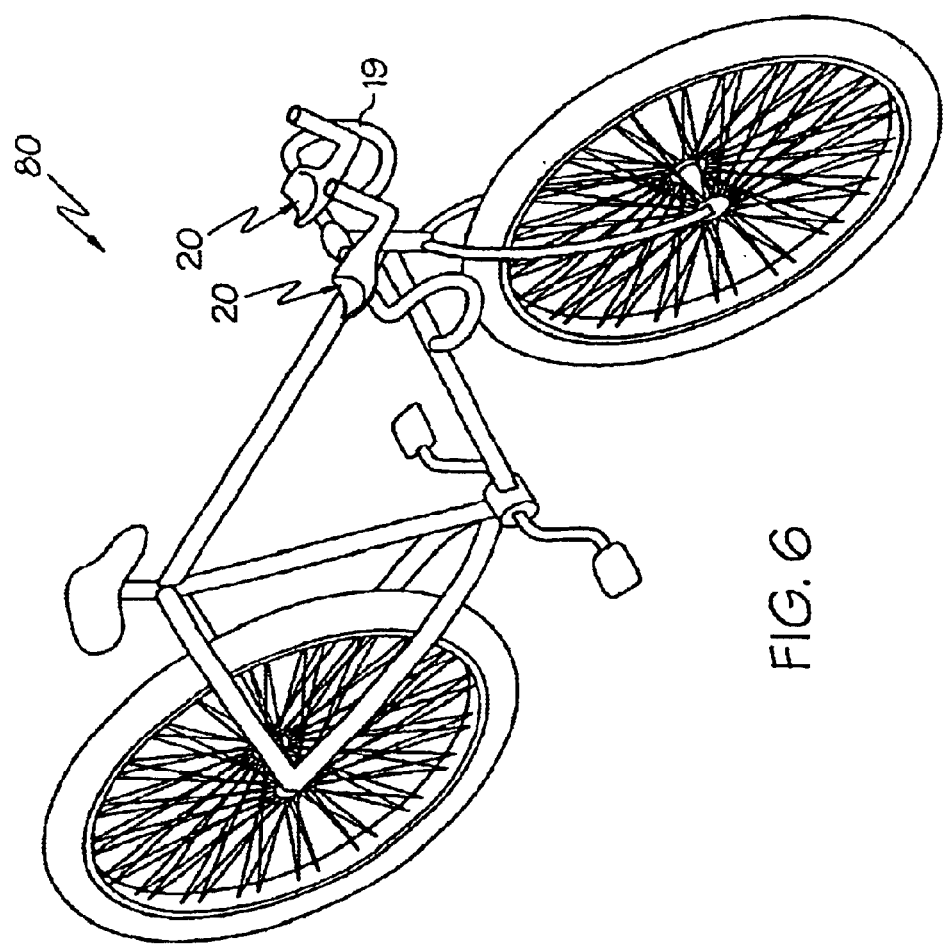
FIG. 6 is a perspective view of a bicycle having a pair of handlebar extensions mounted to the handlebar of the bicycle.

An exemplary embodiment of a right-handed handlebar extension according to the present invention is depicted in FIG.1, wherein handlebar extension 20 is shown being attached to a bicycle handlebar 19. Handlebar extension 20 is termed "right-handed" in that it is configured to support a cyclist's right arm and be secured to a handlebar adjacent the right side of the stem. A left-handed version of the handlebar extension is shown in FIGS. 2, 4 and 5, and it will be understood that the left-handed version is simply a mirror image of the right-handed version. In general, a pair of handlebar extensions will typically be employed, with the right-handed extension secured to the handlebar adjacent the right side of the stem, and the left-handed extension secured to the handlebar adjacent the left side of the stem (in a manner similar to other prior art aerobars). FIG. 6 depicts a pair of handlebar extensions 20 attached to the handlebar 19 of a bicycle 80 in this manner.

As shown in FIG. 1, handlebar extension 20 includes an armrest portion 21 and an elongate forward portion 25. In the embodiment shown, the armrest portion 21 is anatomically configured to conform to the underside of a riders forearm, adjacent the elbow. Thus, armrest portion 21 has a concave upper surface 22 which is configured to cradle the riders forearm. Lower surface 23 of armrest portion 21 may be convex in shape so that the cross-sectional thickness of armrest portion 21 is nearly constant throughout armrest portion 21. Of course the outer edges of armrest portion 21 where upper surface 22 and lower surface 23 meet may be rounded in order to improve the aesthetics and strength of the handlebar extension. When viewed from the top (FIG. 2), armrest portion 21 has a generally oval appearance. However, any of a variety of other configurations may be employed for the shape of the outer periphery of armrest portion 21.

As also shown in FIG. 1, elongate forward portion 25 extends forwardly away from one side of armrest portion 21. In the embodiment shown in FIG. 1, handlebar extension 20 is configured for right-handed use, and elongate forward portion 25 extends forwardly away from the interior side of armrest portion 21. Therefore, when the right forearm of a rider is positioned on armrest portion 21, elongate forward portion 25 will extend forwardly along the interior surface of the riders right forearm. As best seen in the side view of FIG. 3, upper edge 27 of elongate forward portion 25 extends forwardly away from upper interior edge 28 of armrest portion 21. Lower edge 29 of elongate forward portion 25 is spaced away from upper edge 27 by a distance which may be less than the height A (FIG. 3) of armrest portion 21. In this manner, when handlebar extension 20 is positioned in the manner shown in FIG. 3 with lower surface 23 of armrest portion 21 horizontal, elongate forward portion 25 will be located above the lowermost point of upper surface 22 of armrest portion 21. In this manner, when a riders forearm is positioned on armrest portion 21, the inner surface of the remainder of the riders forearm will extend forwardly along inside wall 30 of elongate forward portion 25. In this manner, the rider may urge their forearm against inside wall 30 in order to steer and control the bicycle.

Figure 3:
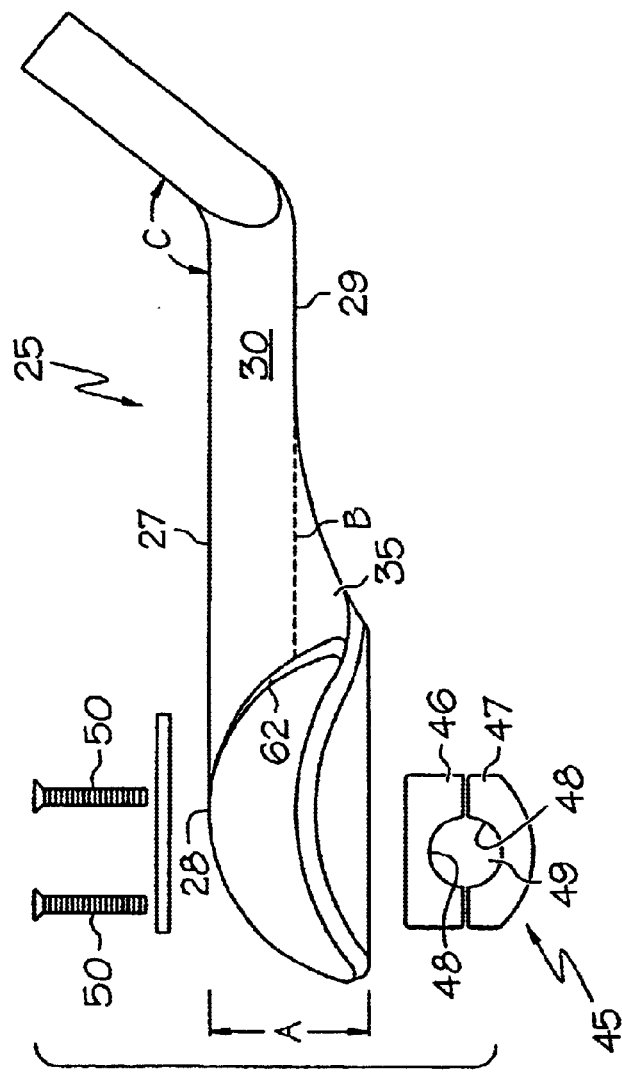
FIG. 3 is an outer side view of the handlebar extension shown in FIG. 1.

The dashed line B shown in FIG. 3 has been included for the sole purpose of defining the lower edge of elongate forward portion 25 for purposes of the present patent application. In order to provide a more aesthetically-pleasing configuration for handlebar extension 20 and also to provide greater strength, a gusset (or flange) portion 35 (see FIG. 2) is located between armrest portion 21 and elongate forward portion 25. Gussett portion 35 extends and curves upwardly away from the forward edge of armrest portion 21 to lower edge 29 of elongate forward portion 25. In this manner, not only does gussett portion 35 provide an esthetically-pleasing appearance, it also provides a smooth transition between armrest portion 21 and elongate forward portion 25. In fact, by including gussett portion 35, a substantially continuous surface extends along the inner wall 30 of elongate forward portion 35, across the upper surface of gussett portion 35 and along upper surface 22 of armrest portion 21. This substantially continuous surface also is ergonomically designed to extend along, and closely follow the contours of the riders forearm.

As mentioned previously, the configuration of handlebar extension 20 is such that the elongate forward portion 25 will be located along the interior of the riders forearm rather than being exposed below the riders forearm, as in prior art designs. This arrangement provides an added benefit of improving aerodynamics since, when a pair of handlebar extensions are employed on a bicycle, the elongate forward portion of each handlebar extension will be positioned between the riders forearms. The riders forearm will inhibit airflow across inner wall 30 of elongate forward portion 25, and a reduced amount of air (if any) will flow across outer wall 31 of elongate forward portion 25 since outer wall 31 will be positioned between the riders forearms. If the handlebar extensions are located closely together, the rider's hands will tend to block all (or nearly all) of the airflow between the rider's forearms.

Since the rider is able to apply pressure with the inner surface of their forearms against inner wall 30 of elongate forward portion 25, the rider may not need to use their hands for purposes of steering. Therefore, the rider may simply place their hand around the distal end 36 of elongate forward portion 25 while riding. In fact, distal end 36 may even be enlarged and/or ergonomically shaped in order to provide a better gripping surface.

Many riders, however, will prefer a more conventional grip portion located at the distal end of elongate forward portion 25. Therefore a grip portion 40 may extend upwardly away from distal end 36 of elongate forward portion 25, as shown in FIG. 1. Grip portion 40 may extend upwardly away from the distal end of elongate forward portion 25 at an angle C (see FIG. 3) of between 0 and 90°, particularly an angle between of about 30° and 60°. In this manner, grip portion 40 provides a convenient location for the rider to grip the handlebar extension. Furthermore, grip portion 40 may be cylindrical in shape such that a conventional shifting device (such as a shift lever) may be readily attached to grip portion 40. Alternatively, or in addition thereto, a bridge connector may be attached to the distal ends 41 of grip portions 40 in order to connect right and left-handed handlebar extensions 20 when mounted on a bicycle. In fact, as known to those skilled in the art, a gear shifting mechanism may even be mounted on such a bridge connector.

The handlebar extension of the present invention may be attached to the bicycle in any of a variety of manners. In the embodiment shown, however, a mounting bracket is employed to secure armrest portion 21 to the bicycle handlebar. In this manner, armrest portion 21 will actually support elongate forward portion 25 of the handlebar extension, since armrest portion 21 and elongate forward portion 25 form an integral, unitary structure. In fact, in the embodiment shown, when armrest portion 21 is attached to the handlebar of a bicycle, armrest portion 21 will support the remainder of handlebar extension 20.

As best seen in FIGS. 1, 3 and 5, mounting bracket 45 generally comprises upper and lower clamp members 46 and 47, respectively. Each claim member 46 and 47 includes an arcuate portion 48 such that, when the upper and lower clamp members are aligned as shown in FIG. 3, arcuate portion 48 will define a cylindrical passageway 49 which is sized and configured to accommodate a bicycle handlebar. Thus, a bicycle handlebar may be positioned between arcuate portion 48 of upper and lower clamp members 46 and 47 so that when the upper and lower members are secured to one another, the bicycle handlebar will be securely held between the clamp members in the manner known to those skilled in the art.

In order to secure armrest portion 21 to mounting bracket 45, one or more fasteners may extend through armrest portion 21 and engage mounting bracket 45. In the embodiment shown, a pair of threaded fasteners 50 (such as threaded bolts) extend through armrest portion 21 as shown. A pair of threaded bores 52 extend through upper and lower clamp members 46 and 47 such that threaded fasteners 50 may be secured within these threaded bores. In fact, since the threaded bores on upper and lower clamp members 46 and 47 are aligned with one another, threaded fasteners 50 may be secured within these aligned bores in order to not only attach armrest portion 21 to mounting bracket 45, but also to secure upper and lower clamp members 46 and 47 to one another with the bicycle handlebar rigidly secured within cylindrical passageway 49. Of course it is also contemplated that bores 48 on lower clamp member 47 is threaded while bores 48 on upper clamp member 46 are not. As yet another alternative, bores 48 on both clamp members may be unthreaded, and simple bolts positioned on the underside of lower clamp member 48 in order to secure the threaded fasteners to the mounting bracket and securely hold a handlebar between the clamp members.

Although threaded fasteners 50 may merely be positioned within apertures extending through armrest portion 21, it may be desirable to provide some adjustability in the mounting of handlebar extension 20 to a bicycle. Therefore, as best seen in FIG. 2, rather than having a pair of apertures sized to accommodate threaded fasteners 50, armrest portion 21 may include a plurality of elongated slots 55 which extend through the thickness of armrest portion 21. In this manner, threaded fasteners may be positioned so as to extend through elongated slots 55 into the threaded bores of mounting bracket 45. However, since slots 55 are elongated and have a width slightly greater than the diameter of the fasteners, threaded fasteners 50 may be positioned anywhere along the length of slots 55. Therefore, by employing elongated slots 55 rather than simple apertures sized to closely accommodate threaded fasteners therein, some lateral adjustability in the mounting of handlebar extension 20 is provided. More importantly, as best seen in FIGS. 1 and 5, upper surface 56 of upper clamp member 46 is curved in a manner similar to the under surface of armrest portion 21. Therefore, by altering the location of elongated slots 55 through which the fasteners extend, armrest portion 21 may be rotationally adjusted about an axis extending along its length (and shown in dashed line in FIG. 4). In this manner, the cyclist may adjust the orientation of armrest portion 21 (and hence the entire handlebar extension), as desired.

Furthermore, in the embodiment shown, there are more elongated slots 55 than threaded fasteners 50. In the exemplary embodiment shown, four elongated slots are provided, namely elongated slots 55A, 55B, 55C and 55D. The spacing between adjacent elongated slots 55 is generally about one-half the distance between the threaded bores on mounting bracket 45. In this manner, the pair of threaded fasteners 50 may be positioned within either elongated slots 55A and C, or within elongated slots 55B and D. Therefore, by utilizing more elongated slots than threaded fasteners, fore and aft adjustability is provided. In other words, by utilizing elongated slots 55A and 55C, the cyclist may mount the handlebar extension to the bicycle such that elongate forward portion 25 extends a greater distance away from the bicycle handlebar than if elongated slots 55B and 55D are employed.

In order to provide a more rigid and secure connection between armrest portion 21 and mounting bracket 45, an alloy bolt plate 60 may be used. Bolt plate 60 may be made of any of a variety of rigid, preferably lightweight, materials, such as aluminum alloy. Bolt plate 60includes a plurality of apertures 61, each of which is configured to align with a portion of one of the elongated slots 55 of armrest portion 21. In addition, a recessed area 63 may be provided in the upper surface of armrest portion 21 in order to accommodate bolt plate 60. In this manner, bolt plate 60 may be positioned in recess area 63 such that bolt plate 60 will not extend above the upper surface 22 of armrest portion 21. Threaded fasteners 50 may be inserted through a pair of apertures 61 and the corresponding pair of elongated slots 55 in order to secure the handlebar extension to mounting bracket 45 (and hence the bicycle handlebar).

Although apertures 61 may be replaced by elongated slots corresponding to elongated slots 55 in order to provide greater stability, the configuration of mounting plate 60 shown in FIGS. 4 and 5 actually provides two distinct mounting positions for the handlebar extension. In particular, as seen in FIG. 4, apertures 61 are offset from the center line of bolt plate 60. Therefore, bolt plate 60 may be rotated 180° from the orientation shown in FIG. 4 in order to provide a second mounting position. In this manner, bolt plate 60 will allow for two distinct lateral or rotational mounting positions of the handlebar extension.

Handlebar extension 20 may be made from any of a variety of materials known to those skilled in the art. However, since handlebar extension 20 generally comprises an integrated, unitary structure, the use of composite and/or polymeric materials (such as molded plastic) may be effectively employed. Suitable composite materials include, for example, carbon fiber (particularly resin impregnated carbon fiber) which is often used for a variety of bicycle components (including bicycle wheels and frames). Fibers made of aramid, glass or Kevlar may also be employed. In one particular embodiment, handlebar extension 20 may be formed from woven carbon fiber plies using a two piece form or mold in any of a variety of manners well-known to those skilled in the art. Cylindrical grip portion 40 may be separately formed, and thereafter placed into the form or mold along with the other carbon fiber plies. In addition, a foam core may be used for forming all or a portion of handlebar extension 20. For example, a foam core may be provided within every portion of extension 20 other than grip portion 40. Of course this is merely one exemplary process for producing handlebar extension 20, and is by no means to be considered limiting. For example, it would even be possible to form handlebar extension 20 by means of a plastic molding process, such as by using reinforced plastic material.

Regardless of the manufacturing technique employed, handlebar extension 20 provides a rigid and strong structure. In particular, elongate forward portion 25 will generally have an oval (or substantially oval) cross-sectional shape which provides added strength and rigidity. As is known to those skilled in the art, the strength of handlebar extension 20 may also be increased by the manner in which the handlebar extension is manufactured. For example, the orientation of the carbon fiber may be chosen to improve the overall strength and rigidity of the handlebar extension. By way of further example, woven carbon fiber sheets may be laid into the form or mold such that the fibers generally extend lengthwise in armrest portion 21 and elongate forward portion 25, and upwardly along the longitudinal length of grip portion 40. Of course multiple carbon fiber sheets may be used, and the orientations of the fibers may be varied in order to further improve strength and rigidity.

Of course one significant advantage of using carbon fiber or other composite materials is weight savings. Of course the fact that handlebar extension 20 is an integrated, unitary structure allows the entire handlebar extension to be formed in this manner. Prior art configurations, on the other hand, have not integrated the armrest portion with the forward extension as a unitary structure, and therefore weigh more than the handlebar extension of the present invention.

Although not always necessary, an armrest pad may be positioned on the upper surface 22 of armrest portion 21 in order to provide cushioning. Such a pad may be made from any of a variety of cushioning materials, such as a polymeric foam. In addition, the pad may be configured to correspond to the shape of armrest portion 21, and maybe attached thereto by any of a variety of means such as an adhesive or even hook and loop fasteners adhesively secured to armrest 21 and the armrest pad.

As best seen in FIG. 3, part or all of the upper surface of armrest portion 21 may be recessed in order to accommodate a cushioning pad thereon. In particular, a recessed portion 62 may be provided adjacent the leading edge of the upper surface of armrest portion 21 (i.e., along the edge where the upper surface of armrest portion 21 meets gusset portion 35 and elongate forward portion 25). The depth of this recessed portion 62 may be chosen such that when a cushioning pad is employed, the upper surface of the pad (particularly when supporting a rider's forearm) will be flush with the surface of gusset portion 35 and elongate forward portion 25. In this manner, the cyclist will feel a smooth, continuous surface which closely follows the cyclist's forearm. Of course it is also possible to recess the entire upper surface of armrest portion 21 in order to accommodate the thickness of a cushioning pad thereon.

Finally, the handlebar extension of the present invention may be made in any of a variety of sizes. For example, forward portion 25 may be lengthened to accommodate taller riders (as shown in FIGS. 2 and 4). Also, the height of bracket member 45 may be increased or decreased in order to control the height of armrest portion 21 above the handlebar.

What I claim is:

1. A bicycle having a handlebar for steering said bicycle, a pair of spaced apart handlebar extensions mounted to said handlebar, and a pair of mounting brackets which secure said handlebar extensions to said handlebar, wherein each of said handlebar extensions comprises an armrest portion and an elongate forward portion extending forwardly away from said handlebar and said armrest portion, wherein each of said elongate forward portions is supported by the armrest portion from which said elongate forward portion extends, and further wherein said armrest portion and said elongate forward portion of each of said handlebar extensions comprises an integral, unitary structure formed from carbon fiber.

2. The bicycle of claim 1, wherein each of said handlebar extensions further comprises a grip portion extending upwardly away from the distal end of said elongate forward portion.

3. The bicycle of claim 1, wherein each of said armrest portions has an interior side, a lower surface and a concave upper surface, and further wherein each of said elongate forward portions extends away from said interior side of the supporting armrest portion.

4. The bicycle of claim 3, wherein said elongate forward portion has an outer wall and an inner wall, and further wherein a continuous surface extends along the outer wall of said elongate forward portion and across the lower surface of said armrest portion.

5. The bicycle of claim 3, wherein said elongate forward portion has an outer wall and an inner wall, and further wherein a substantially continuous surface extends along the inner wall of said elongate forward portion and across the upper surface of said armrest portion.

* * * * *